(12) United States Patent  
Muizelaar et al.

(10) Patent No.: US 8,459,432 B2
(45) Date of Patent: Jun. 11, 2013

(54) FRICTION CLUTCH AND METHOD TO REDUCE DRAG LOSS IN FRICTION CLUTCH

(75) Inventors: Richard D. Muizelaar, Mississauga (CA); Sean Steele, Mississauga (CA); Jianwen Li, Vaughan (CA); Andrew Kowalski, Toronto (CA)

(73) Assignee: Magna Powertrain, Inc., Concord (CA)

( * ) Notice: Subject to any disclaimer, the term of this patent is extended or adjusted under 35 U.S.C. 154(b) by 257 days.

(21) Appl. No.: 12/919,020

(22) PCT Filed: Dec. 15, 2008

(86) PCT No.: PCT/CA2008/002164
§ 371 (c)(1),
(2), (4) Date: Aug. 24, 2010

(87) PCT Pub. No.: WO2009/105861
PCT Pub. Date: Sep. 3, 2009

(65) Prior Publication Data
US 2011/0000757 A1    Jan. 6, 2011

Related U.S. Application Data

(60) Provisional application No. 61/032,110, filed on Feb. 28, 2008.

(51) Int. Cl.
*F16D 13/00*    (2006.01)
*F16D 13/72*    (2006.01)
*F16D 13/74*    (2006.01)

(52) U.S. Cl.
USPC ................. 192/113.35; 192/85.61; 192/70.12

(58) Field of Classification Search
USPC .......................................... 192/85.61, 113.35
See application file for complete search history.

(56) References Cited

U.S. PATENT DOCUMENTS

| | | | |
|---|---|---|---|
| 3,025,686 A | 3/1962 | Lewis | |
| 3,547,235 A * | 12/1970 | Weinrich | 188/271 |
| 3,773,157 A | 11/1973 | Koch et al. | |
| 3,897,860 A | 8/1975 | Borck et al. | |
| 3,981,381 A | 9/1976 | Nosek | |
| 4,027,755 A | 6/1977 | Evans et al. | |
| 4,142,619 A | 3/1979 | Spokas | |
| 4,270,647 A * | 6/1981 | Leber | 192/113.35 |
| 4,280,608 A | 7/1981 | Labuda et al. | |
| 4,313,533 A | 2/1982 | Aschauer | |
| 4,446,953 A | 5/1984 | Voss et al. | |
| 4,474,278 A | 10/1984 | Miura | |

(Continued)

FOREIGN PATENT DOCUMENTS
JP    356028321    *    3/1981

*Primary Examiner* — David D Le
*Assistant Examiner* — Colby M Hansen
(74) *Attorney, Agent, or Firm* — Dickinson, Wright

(57) ABSTRACT

A wet clutch includes a rotatable hub and a rotatable drum having an aperture extending therethrough. A plurality of outer clutch plates are fixed for rotation with the drum. A plurality of inner clutch plates are fixed for rotation with the hub and interleaved with the outer clutch plates. A piston is moveable to apply a force to the inner and outer clutch plates to transfer torque between the hub and the drum. A cover is moveable relative to the drum between first and second positions. The cover selectively restricts a flow of fluid through the aperture in the drum when in the first position.

23 Claims, 2 Drawing Sheets

U.S. PATENT DOCUMENTS

| | | |
|---|---|---|
| 4,502,582 A | 3/1985 | Lech, Jr. et al. |
| 4,529,073 A | 7/1985 | Lewis |
| 4,544,055 A | 10/1985 | Kronstadt |
| 4,624,353 A | 11/1986 | Sailer et al. |
| 4,830,160 A | 5/1989 | Marshall |
| 4,958,712 A | 9/1990 | Suganuma et al. |
| 5,176,236 A | 1/1993 | Ghidorzi et al. |
| 5,469,943 A | 11/1995 | Hill et al. |
| 5,755,314 A * | 5/1998 | Kanda et al. ............... 192/70.12 |
| 6,189,669 B1 | 2/2001 | Kremer et al. |
| 6,244,407 B1 * | 6/2001 | Kremer et al. ............. 192/70.12 |
| 6,283,265 B1 | 9/2001 | Hirayanagi et al. |
| 6,293,382 B1 | 9/2001 | Nishide et al. |
| 6,394,243 B1 | 5/2002 | Sasse |
| 6,499,579 B2 | 12/2002 | Ono et al. |
| 6,702,088 B2 | 3/2004 | Kitaori et al. |
| 6,745,884 B2 | 6/2004 | Hick et al. |
| 6,899,783 B2 | 5/2005 | Oguri et al. |
| 6,910,561 B2 | 6/2005 | Sasse |
| 6,945,371 B2 | 9/2005 | Schmidt |
| 6,976,567 B2 | 12/2005 | Kitabayashi |
| 7,059,459 B2 | 6/2006 | Miyoshi |
| 7,172,062 B2 | 2/2007 | Kitahara et al. |
| 7,249,663 B2 | 7/2007 | Mordukhovich et al. |
| 2004/0159521 A1 * | 8/2004 | Yamamura et al. ........ 192/70.12 |
| 2007/0000747 A1 | 1/2007 | Miyazaki |
| 2007/0102258 A1 | 5/2007 | Miyazaki et al. |
| 2007/0199794 A1 | 8/2007 | Miyazaki et al. |
| 2007/0227852 A1 | 10/2007 | Uhler |
| 2007/0278062 A1 | 12/2007 | Tsuboi et al. |
| 2008/0073171 A1 | 3/2008 | Mordukhovich et al. |
| 2011/0111917 A1 * | 5/2011 | Heitzenrater et al. ........ 475/331 |

* cited by examiner

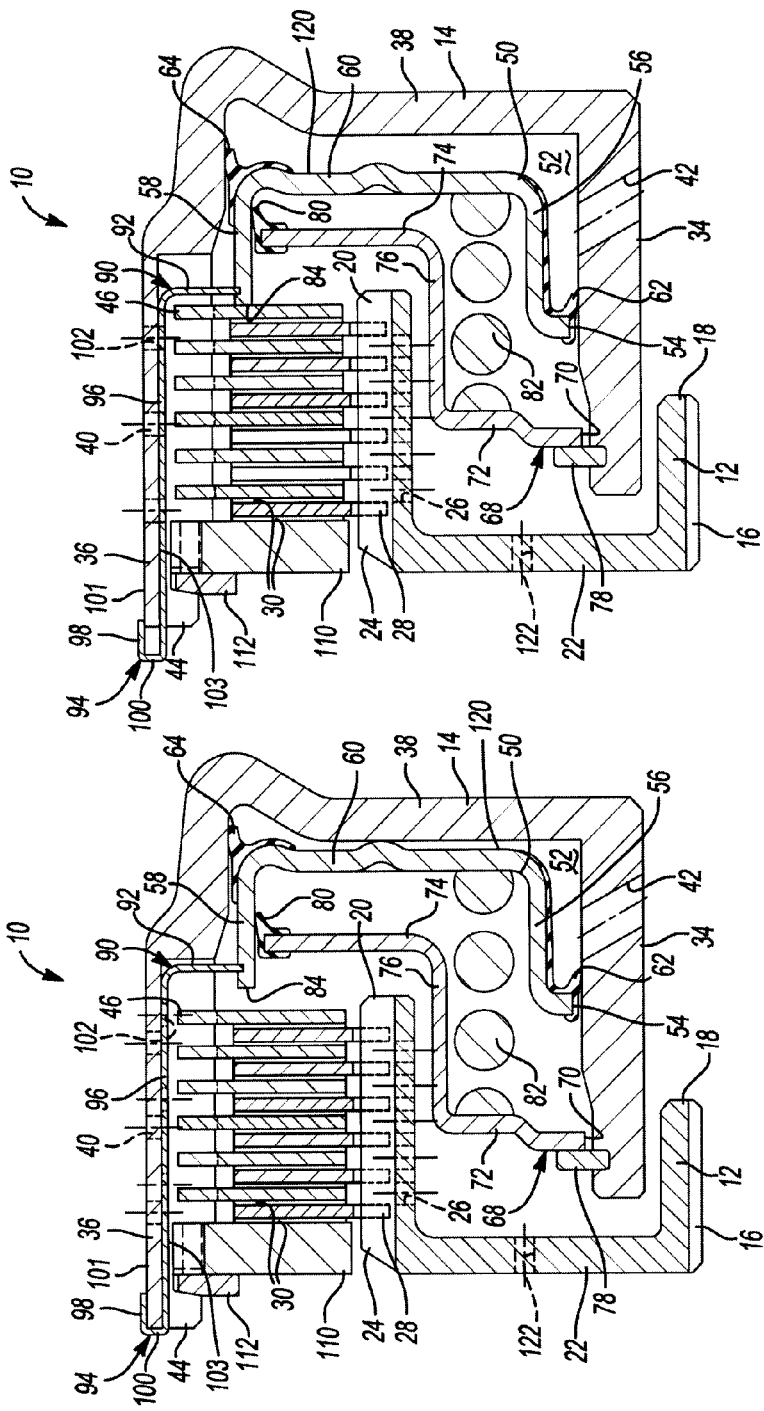

a piston positioned in a retracted

FRICTION CLUTCH AND METHOD TO REDUCE DRAG LOSS IN FRICTION CLUTCH

BACKGROUND

The present disclosure relates to a method and apparatus for reducing clutch drag loss. More particularly, a clutch having a moveable cover selectively restricting a flow of oil within the clutch is disclosed.

Typical wet clutches include a drum rotatable relative to a hub. A plurality of outer clutch plates are in driving engagement with the drum and a plurality of inner clutch plates are in driving engagement with the hub. The inner and outer clutch plates are interleaved with one another. Some friction plate clutches are designated as wet clutches and have oil positioned between the hub and the drum in contact with the inner and outer clutch plates. Wet clutches are typically operable in a disengaged mode where little to no torque is transferred between the drum and the hub and an engaged mode when torque is transferred between the clutch hub and the clutch drum.

When the known wet clutch is in the disengaged mode, oil may be pumped across the outer plates and the inner plates. Alternatively, oil is trapped between the hub and the drum and remains located between the hub and the drum during all modes of operation. As such, a certain amount of energy is required to shear the oil located between the inner and outer clutch plates when the clutch is in the disengaged mode. This energy may be referred to as clutch drag loss. Clutch drag loss therefore becomes a parasitic energy loss associated with vehicles operating with wet clutches of this design.

SUMMARY

A wet clutch includes a rotatable hub and a rotatable drum having an aperture extending therethrough. A plurality of outer clutch plates are fixed for rotation with the drum. A plurality of inner clutch plates are fixed for rotation with the hub and interleaved with the outer clutch plates. A piston is moveable to apply a force to the inner and outer clutch plates to transfer torque between the hub and the drum. A cover is moveable relative to the drum between first and second positions. The cover selectively restricts a flow of fluid through the aperture in the drum when in the first position.

Furthermore, a wet clutch includes a rotatable hub and a rotatable drum having an aperture extending therethrough. A plurality of outer clutch plates are fixed for rotation with the drum. A plurality of inner clutch plates are fixed for rotation with the hub and interleaved with the outer clutch plates. A piston is moveable to apply a force to the inner and outer clutch plates to transfer torque between the hub and the drum. A fluid path includes a drum aperture, extends across the inner and outer clutch plates and includes an exit passage. A cover is moveable relative to the drum between first and second positions. The cover selectively allows fluid flow through the fluid path when in the second position. The cover restricts flow through the aperture in the drum when in the first position to allow fluid to escape through the exit passage and reduce restriction to relative motion between the first and second clutch plates.

Additionally, a method of reducing drag loss in a wet clutch including a rotatable drum, a rotatable hub, a moveable piston, clutch plates and a moveable cover is disclosed. The method includes moving the piston to an advanced position to apply a force to the clutch plates and transfer torque between the hub and the drum. The method also includes moving the cover to allow fluid to flow through an aperture formed in the drum. Fluid flows past the clutch plates and out of the clutch. The piston is moved to a retracted position to discontinue torque transfer between the clutch and the hub. The cover is moved to restrict fluid flow through the aperture formed in the drum. Fluid previously positioned in communication with the clutch plates is moved to a location remote from the clutch plates to reduce the restriction to relative motion between the clutch and the hub.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 1 is a fragmentary cross-sectional side view of a clutch assembly having a piston positioned in a retracted position;

FIG. 2 is a cross-sectional side view of the clutch assembly of FIG. 1 showing the piston assembly in an advanced position;

DETAILED DESCRIPTION

Figure 3:
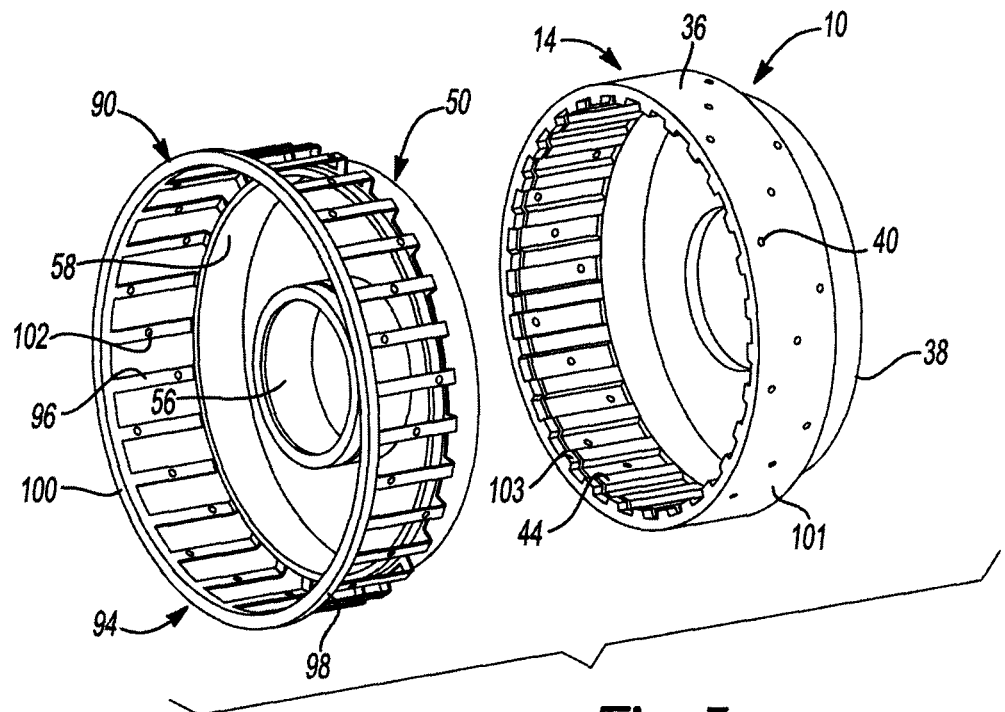
FIG. 3 is an exploded perspective view of the drum, piston and cover of the wet clutch depicted in FIGS. 1 and 2.
Figure 4:
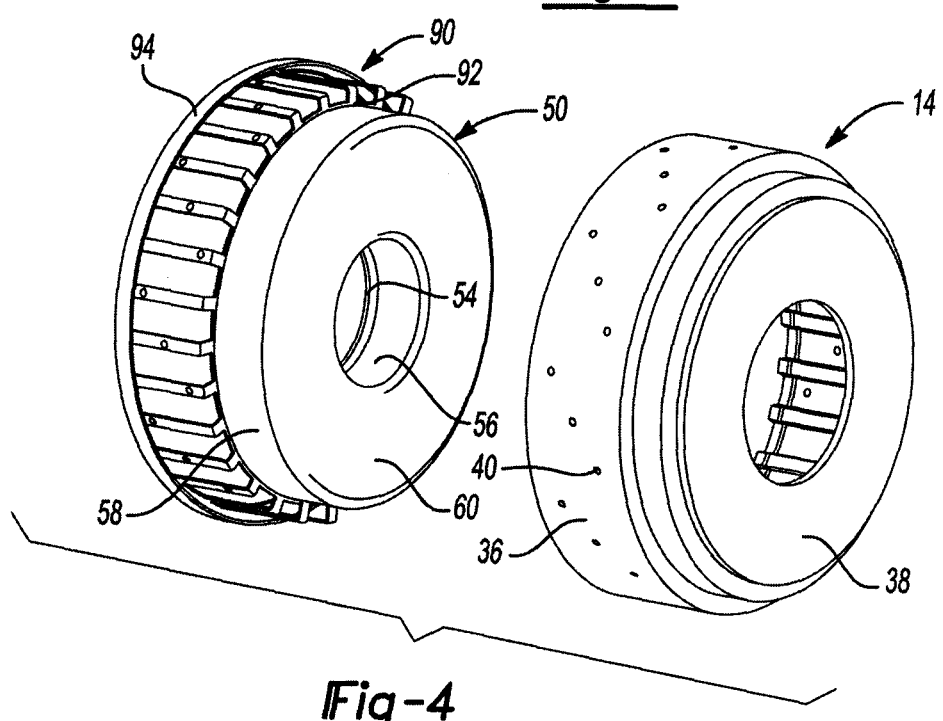
FIG. 4 is an exploded perspective view of the drum, piston and cover of the wet clutch of FIG. 1 taken from a different view point.

The following description is merely exemplary in nature and is not intended to limit the present disclosure, application, or uses. It should be understood that throughout the drawings, corresponding reference numerals indicate like or corresponding parts and features.

A clutch constructed in accordance with the teachings of the present disclosure is generally identified at reference numeral 10. Clutch 10 includes a hub 12 rotatable relative to a drum 14. Clutch 10 is operable to drivingly interconnect hub 12 and drum 14 to transfer torque therebetween. Hub 12 may be drivingly coupled to any number of driving or driven components by an internal spline 16 formed on an inner cylindrical portion 18. Similarly, drum 14 may be drivingly coupled to any number of other rotatable components to transfer torque thereto.

Hub 12 also includes an outer cylindrical portion 20 interconnected to inner cylindrical portion 18 by a radially extending web 22. An external spline 24 is formed on outer cylindrical portion 20. Radially extending apertures 26 extend through outer cylindrical portion 20. A plurality of inner clutch plates 28 are positioned in splined engagement with external spline 24 of hub 12. As such, inner clutch plates 28 are fixed for rotation with but axially moveable relative to hub 12. Each inner clutch plate 28 includes friction pads 30 fixed on opposing faces thereof.

Drum 14 includes an inner cylindrical wall 34 and an outer cylindrical wall 36 interconnected by a radially extending end wall 38. A plurality of apertures 40 radially extend through outer cylindrical wall 36. Apertures 40 may be circumferentially spaced apart and axially staggered relative to one another about the circumference of drum 14. A fluid supply port 42 extends through inner cylindrical wall 34. An internal spline 44 is formed on outer cylindrical wall 36. A plurality of outer clutch plates 46 are positioned in splined engagement with internal spline 44. Accordingly, outer clutch plates 46 are fixed for rotation with but axially moveable relative to drum 14. Outer clutch plates 46 are interleaved with inner clutch plates 28.

A piston 50 is positioned within a recess 52 formed by inner wall 34, outer wall 36 and end wall 38 of drum 14. Piston 50 is axially moveable relative to drum 14 and includes a central aperture 54 defined by a cylindrically shaped inner wall 56. A cylindrically shaped outer wall 58 is interconnected to inner wall 56 by a bottom wall 60. An inner seal 62 is fixed to inner wall 56 and engages inner cylindrical wall 34 of drum 14. An outer seal 64 is fixed to outer wall 58 of piston 50. Outer seal 64 engages outer wall 36 of drum 14.

A dam 68 is shaped as a circular member having a central aperture 70 extending therethrough. Dam 68 includes an inner radially extending flange 72 and an outer radially extending flange 74 interconnected by a cylindrical body 76. A snap ring 78 restricts dam 68 from moving relative to drum 14 in one direction. A dam seal 80 is fixed to outer flange 74 and engages outer wall 58 of piston 50. A return spring 82 is positioned between piston 50 and dam 68 to bias piston 50 toward a retracted position shown in FIG. 1. Piston 50 is moveable between the retracted position shown in FIG. 1 and an advanced position shown in FIG. 2. An engagement surface 84 of piston 50 is spaced apart from inner clutch plates 28 and outer clutch plates 46 when piston 50 is in the retracted position. When piston 50 is in the advanced position, engagement face 84 is in contact with one of outer clutch plates 46 to transfer torque between hub 12 and drum 14. p A cover 90 is a substantially cup-shaped member having an inner ring 92 fixed to piston 50. An outer ring 94 is interconnected to inner ring 92 by a plurality of axially extending and circumferentially spaced apart webs 96. Second ring 94 includes a cylindrically-shaped outer leg 98 axially extending from a plate portion 100. Second ring 94 partially envelopes an end portion of outer wall 36 to guide cover 90 during movement relative to drum 14. Outer leg 98 is positioned adjacent to an outer surface 101 of drum 14. Webs 96 are positioned adjacent to an inner surface 103 of drum 14. Cover 90 includes a plurality of apertures 102 extending therethrough. Apertures 102 are circumferentially spaced apart and axially offset from each other along adjacent webs in the same pattern that apertures 40 are placed along drum 14. When piston 50 is in the retracted position shown in FIG. 1, apertures 102 are not aligned with apertures 40. As such, fluid may not pass through apertures 40. When piston 50 is placed in the advanced position as shown in FIG. 2, apertures 102 align with apertures 40 such that fluid may travel through both sets of apertures 40 and 102.

Clutch 10 also includes a reaction plate 110 placed in splined engagement with drum 14. A snap ring 112 is fixed to drum 14 to restrict reaction plate 110 from moving in one direction relative to drum 14.

The operation of clutch 10 will be described beginning with clutch 10 in the torque transferring or engaged mode where piston 50 is axially moved to the advanced position as shown in FIG. 2. Pressurized fluid is pumped through supply port 42 to apply a pressure to a back face 120 of piston 50. Both piston 50 and cover 90 axially translate such that engagement face 84 engages one of outer clutch plates 46 and apertures 102 are aligned with apertures 40. Force is transferred from piston 50 through each of outer clutch plates 46 and inner clutch plates 28 where the force is reacted by reaction plate 110. At this time, torque is transferred between hub 12 and drum 14. Furthermore, because apertures 102 are aligned with apertures 40, fluid may be pumped through a fluid path from a location outside of drum 14 through apertures 40, through apertures 102 and into contact with inner clutch plates 28 and outer clutch plates 46. The fluid is heated by the clutch plates. Fluid continues along the fluid path through apertures 26 extending through hub 12 through an exit port 122 to a location remote of clutch 10 so the fluid may be cooled.

FIG. 1 depicts piston 50 in the position corresponding to a disengaged clutch mode. In this mode of operation, pressurized fluid is not supplied through supply port 42 to act on piston 50. As such, return spring 82 drives piston 50 into contact with end wall 38 of drum 14. Engagement face 84 is spaced apart from outer clutch plates 46 and inner clutch plates 28. The inner and outer clutch plates are free to rotate relative to one another without transferring torque between hub 12 and drum 14. Because cover 90 is positioned to misalign apertures 102 and apertures 40, fluid is not pumped through apertures 40. Because fluid is not being re-supplied to clutch 10, fluid that may be in communication with inner clutch plates 28 and outer clutch plates 46 may pass through apertures 26 formed in hub 12 and through exit port 122. The quantity of fluid that was previously located between inner clutch pates 28 and outer clutch plates 46 is now reduced or removed. Resistance to relative rotation between drum 14 and hub 12 is also reduced due to eliminating or at least reducing the energy required to shear the fluid previously contacting inner clutch plates 28 and outer clutch plates 46. Accordingly, the torque required to rotate hub 12 relative to drum 14 is greatly reduced relative to a similarly configured wet clutch where fluid is continuously pumped over or in contact with inner clutch plates 28 and outer clutch plates 46.

It should be appreciated that while a staggered pattern for the placement of apertures 102 and apertures 40 has been disclosed, it is within the scope of the present disclosure to position the apertures along other aligned or misaligned patterns. Furthermore, it is also contemplated that cover 90 may be operated in conjunction with hub 12 and apertures 26 extending therethrough instead of drum 14 and apertures 40.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

What is claimed is:

1. A wet clutch comprising:
   a rotatable hub;
   a rotatable drum having an aperture extending therethrough;
   a plurality of outer clutch plates fixed for rotation with the drum;
   a plurality of inner clutch plates fixed for rotation with the hub and interleaved with the outer clutch plates;
   a piston moveable to apply a force to the inner and outer clutch plates to transfer torque between the hub and the drum; and
   a cover moveable relative to the drum between first and second positions, the cover selectively restricting a flow of fluid through the aperture in the drum when in the first position,
   wherein the piston is moveable between a retracted position corresponding to a disengaged clutch mode and an advanced position corresponding to an engaged clutch mode, the cover being fixed to the piston and positioned to restrict the flow of fluid through the drum aperture when the piston is in the retracted position.

2. The wet clutch of claim 1 wherein the cover is positioned to allow the flow of fluid through the drum aperture when the piston is in the advanced position.

3. The wet clutch of claim 1 wherein the drum includes an outer cylindrical portion including the aperture and a plurality of additional apertures extending therethrough.

4. The wet clutch of claim 3 wherein adjacent apertures extending through the drum are circumferentially spaced apart and axially offset from one another.

5. The wet clutch of claim 1 wherein the drum includes a port in communication with a cavity defined by the drum and the piston, pressurized fluid being selectively supplied to the port to move the piston.

6. The wet clutch of claim 5 further including a spring biasing the piston toward the retracted position.

7. The wet clutch of claim 6 further including a dam retaining the spring within the drum and separating the spring from the fluid associated with the aperture in the drum.

8. The wet clutch of claim 1 further including an aperture extending through the hub, the fluid flowing through the aperture in the drum, across the inner and outer clutch plates and through the aperture in the hub when the cover is in the second position.

9. The wet clutch of claim 8 wherein the piston is in an advanced position supplying a force to the inner and outer clutch plates when the cover is in the second position.

10. The wet clutch of claim 1 wherein the cover includes a plurality of circumferentially spaced apart and axially extending webs.

11. The wet clutch of claim 10 wherein at least one of the webs includes an aperture selectively alignable with the drum aperture.

12. The wet clutch of claim 1 wherein the cover includes a substantially cylindrically-shaped portion positioned adjacent an outer surface of the drum.

13. The wet clutch of claim 12 wherein the cover includes another substantially cylindrically-shaped portion positioned adjacent an inner surface of the drum.

14. The wet clutch of claim 1, wherein the cover includes an aperture that is aligned with the drum aperture in the second position and misaligned with the aperture in the drum in the first position, the misalignment of the first and second apertures restricting flow through the aperture in the drum when in the first position.

15. A wet clutch comprising:
a rotatable hub;
a rotatable drum having first aperture extending therethrough;
a plurality of outer clutch plates fixed for rotation with the drum;
a plurality of inner clutch plates fixed for rotation with the hub and interleaved with the outer clutch plates;
a piston moveable to apply a force to the inner and outer clutch plates to transfer torque between the hub and the drum;
a fluid path including the first aperture, extending across the inner and outer clutch plates and including an exit passage; and
a cover moveable relative to the drum between first and second positions, the cover allowing fluid flow through the fluid path when in the second position, the cover including a second aperture that is aligned with the first aperture in the second position and misaligned with the first aperture in the first position, the misalignment of the first and second apertures restricting flow through the first aperture in the drum when in the first position to allow fluid to escape through the exit passage and reduce restriction to relative motion between the first and second clutch plates.

16. The wet clutch of claim 15 wherein the fluid path includes an aperture extending through the hub.

17. The wet clutch of claim 16 wherein the piston is moveable between a retracted position corresponding to a disengaged clutch mode and an advanced position corresponding to an engaged clutch mode, the cover being fixed to the piston and positioned to restrict the flow of fluid through the first aperture when the piston is in the retracted position.

18. The wet clutch of claim 17 wherein the drum includes a port in communication with a cavity defined by the drum and the piston, pressurized fluid being selectively supplied to the port to move the piston.

19. The wet clutch of claim 18 further including a spring biasing the piston toward the retracted position.

20. The wet clutch of claim 19 further including a dam retaining the spring within the drum and separating the spring from the fluid associated with the first aperture in the drum.

21. A method of reducing drag loss in a wet clutch including a rotatable drum, a rotatable hub, a moveable piston, clutch plates and a moveable cover, the method comprising:
moving the piston to an advanced position to apply a force to the clutch plates and transfer torque between the hub and the drum;
moving the cover to allow fluid to flow through an aperture formed in the drum;
flowing fluid past the clutch plates and out of the clutch;
moving the piston to a retracted position to discontinue torque transfer between the clutch and the hub;
moving the cover with the piston to the retracted position to restrict fluid flow through the aperture formed in the drum; and
moving fluid previously positioned in communication with the clutch plates to a location remote from the clutch plates to reduce the restriction to relative motion between the clutch and the hub.

22. The method of claim 21 further including fixing the cover to the piston.

23. The method of claim 22 further including biasing the piston toward the retracted position.

* * * * *